(12) United States Patent
Naglich et al.

(10) Patent No.: US 7,022,006 B1
(45) Date of Patent: Apr. 4, 2006

(54) CRAB CRACKING TOOL

(76) Inventors: Thomas L. Naglich, P.O. Box 1753, Port Orchard, WA (US) 98366; Lou E. Alex-Andersen, P.O. Box 1753, Port Orchard, WA (US) 98366

(*) Notice: Subject to any disclaimer, the term of this patent is extended or adjusted under 35 U.S.C. 154(b) by 16 days.

(21) Appl. No.: 10/666,131

(22) Filed: Sep. 22, 2003

(51) Int. Cl.
*A22B 5/10* (2006.01)
(52) U.S. Cl. .................................... 452/102
(58) Field of Classification Search ............. 452/2–11, 452/102–105; 47/19.1, 32.7, 33; 40/765, 40/791, 658, 611.12; 256/1, 32–34; 52/101, 52/102
See application file for complete search history.

(56) References Cited

U.S. PATENT DOCUMENTS

| | | | |
|---|---|---|---|
| 909,145 A | 1/1909 | Brunson | |
| D97,316 S | 10/1935 | Worthington et al. | |
| 2,223,308 A * | 11/1940 | Rovell | 40/747 |
| 2,810,416 A | 10/1957 | Russell | |
| 2,987,841 A * | 6/1961 | Phillips | 40/658 |
| 3,270,368 A * | 9/1966 | Cook, Sr. et al. | 452/105 |
| 3,525,493 A * | 8/1970 | Newell et al. | 248/220.21 |
| 3,631,567 A | 1/1972 | Reinke | |
| 4,083,108 A | 4/1978 | Ackeret | |
| 4,316,306 A | 2/1982 | Huebotter | |
| 4,387,520 A * | 6/1983 | Ahrens | 40/652 |
| 4,802,260 A | 2/1989 | Fletcher | |
| 4,858,379 A * | 8/1989 | West | 47/33 |
| 5,625,969 A * | 5/1997 | Vogler | 40/611.12 |
| 6,524,676 B1* | 2/2003 | May | 428/40.1 |
| 6,618,974 B1* | 9/2003 | Szalay | 40/765 |

* cited by examiner

Primary Examiner—Thomas Price

(57) ABSTRACT

A crab cracking tool includes a base having a top surface, a bottom surface, a pair of end edges and a pair of side edges. A cracking member is supply for cracking shellfish upon. A coupler is attached to the top surface for selectively attaching the cracking member to the base such that the cracking member extends upwardly from the base.

11 Claims, 4 Drawing Sheets

CRAB CRACKING TOOL

BACKGROUND OF THE INVENTION

1. Field of the Invention

The present invention relates to shellfish cracking tools and more particularly pertains to a new shellfish cracking tool for efficient cracking of crabs.

2. Description of the Prior Art

The use of shellfish cracking tools is known in the prior art. While these devices fulfill their respective, particular objectives and requirements, the need remains for a tool that easily and efficiently cracks crab while also having the ability be disassembled for storage purposes on a boat.

SUMMARY OF THE INVENTION

The present invention meets the needs presented above by incorporating a cracking member which easily removed from its base.

Another object of the present invention is to provide a new shellfish cracking tool that has a base that includes a storage well for removably receiving the cracking member.

Still another object of the present invention is to provide a new shellfish cracking tool that includes a water buoyant base so that the base will float should it fall off of a boat and into the water.

To this end, the present invention generally comprises a base having a top surface, a bottom surface, a pair of end edges and a pair of side edges. A cracking member is supply for cracking shellfish upon. A coupler is attached to the top surface for selectively attaching the cracking member to the base such that the cracking member extends upwardly from the base.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularly in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
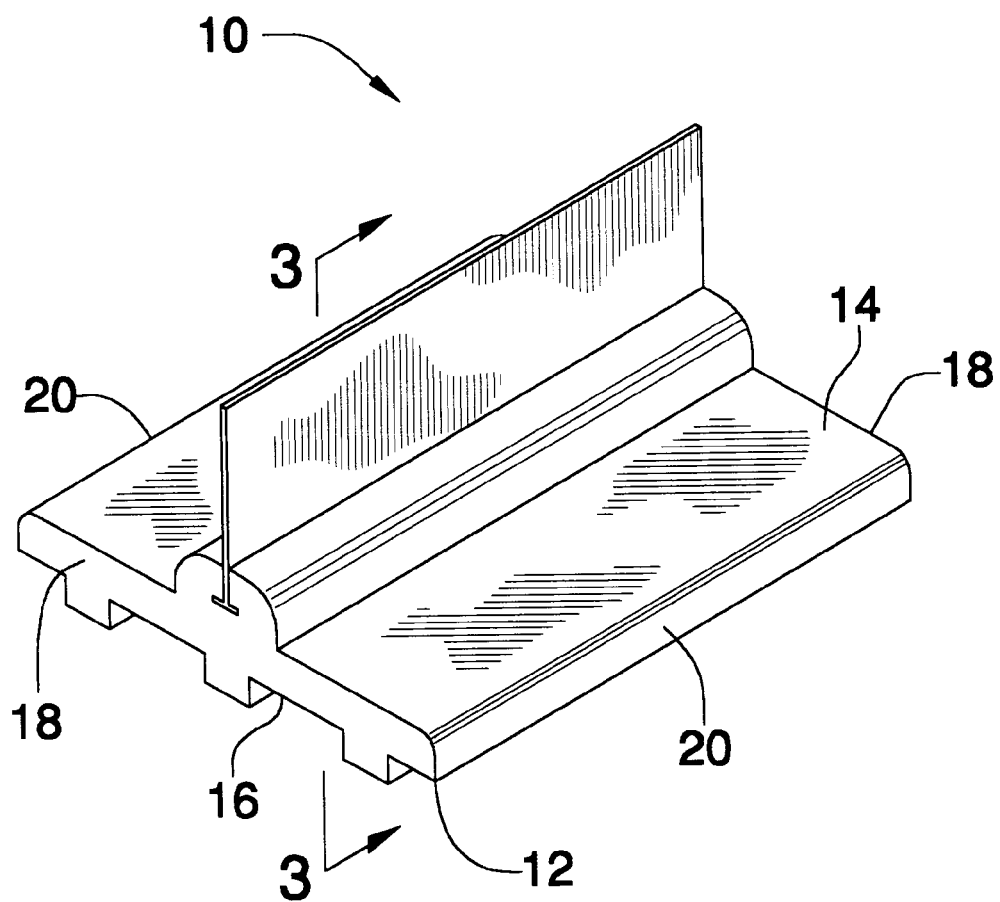
FIG. 1 is a schematic perspective view of a crab cracking tool according to the present invention.
Figure 2:
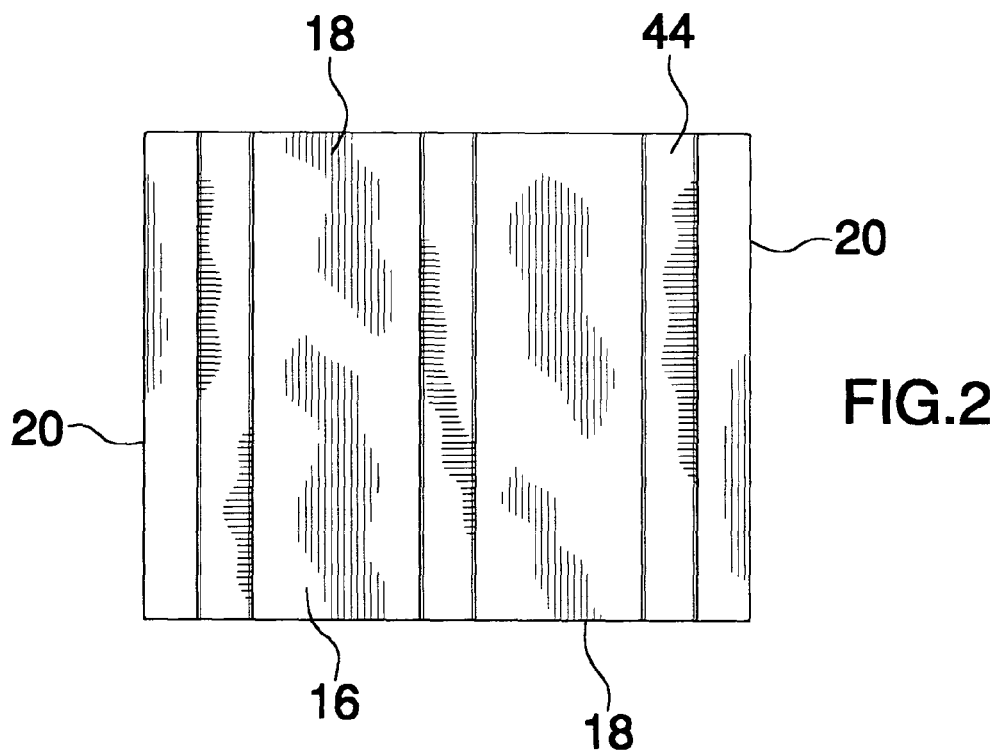
FIG. 2 is a schematic bottom view of the present invention.
Figure 3:
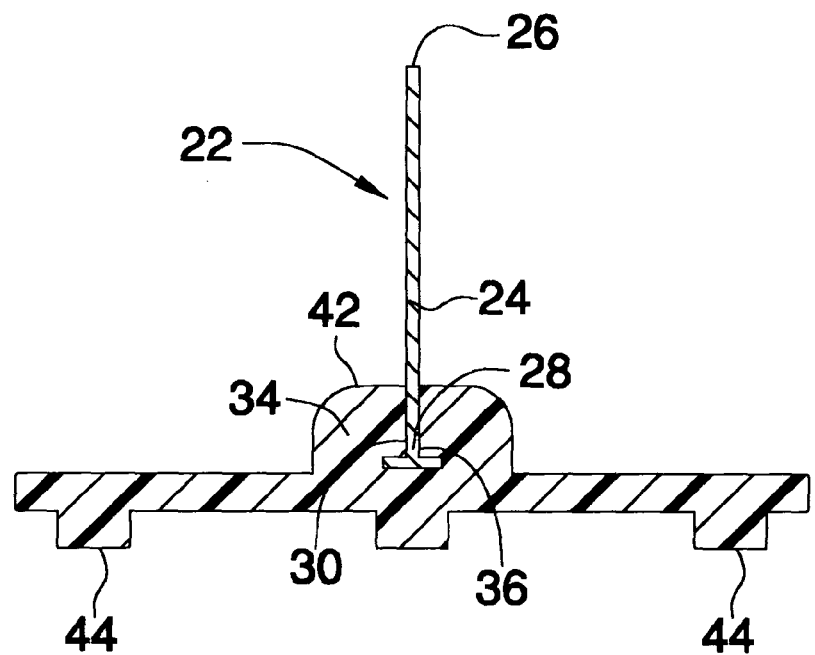
FIG. 3 is a schematic cross-sectional view of the present invention.

With reference now to the drawings, and in particular to FIGS. 1 through 5 thereof, a new shellfish cracking tool embodying the principles and concepts of the present invention and generally designated by the reference numeral 10 will be described.

As best illustrated in FIGS. 1 through 5, the crab cracking tool 10 generally comprises a base 12 having a top surface 14, a bottom surface 16, a pair of end edges 18 and a pair of side edges 20. The top 14 and bottom 16 surfaces each preferably has a generally rectangular shape. For stability, each of the end edges has a length generally between 8 inches and 12 inches and each of the side edges has a length generally between 8 inches and 12 inches. The base 12 ideally comprises a water buoyant material such as a plastic or wood.

A cracking, or cracking, member 22 includes a plate 24 having an upper edge 26 and a lower edge 28. A flange 30 is attached to and extends along a length of the lower edge 28. The flange 30 is orientated generally perpendicular to a plane of the plate 24. The flange 30 extends in opposite directions with respect to the plane of the plate 24.

A coupler 32 is attached to the top surface 14 for selectively attaching the cracking member 22 to the base 12 such that the cracking member 22 extends upwardly from the base 12. The coupler 32 is generally positioned in a central area of the top surface 14. The coupler 32 includes a raised section 34 generally extending between the end edges 18 of the top surface 14. The raised section 34 has a slot 36 extending through a length thereof. The slot 36 has a horizontal portion 38 and a vertical portion 40 extending away from the horizontal 38 and upwardly through and an upper side 42 of the raised surface 34. The flange 30 may be removably extended into the horizontal portion 38 such that the cracking member 22 extends upwardly through the vertical portion 40.

A plurality of feet 44 is attached to the bottom surface 16. Each of the feet 44 is preferably elongated and generally extending between the end edges 18 of the base 12. The feet 44 aid in the stability of the tool 10 and lift it off of a ground or table surface.

Figure 4:
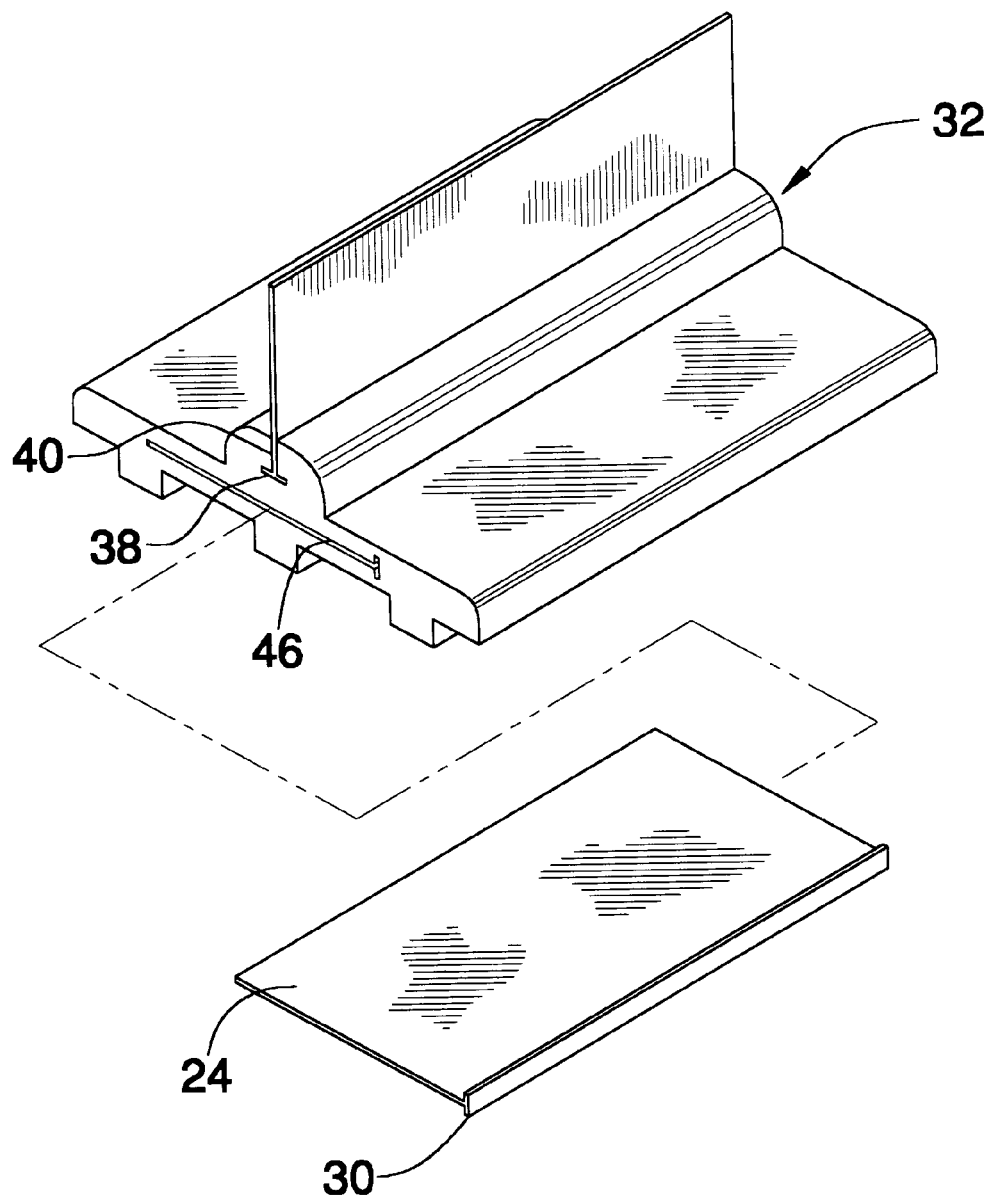
FIG. 4 is a schematic perspective view of a second embodiment of the present invention.
Figure 5:
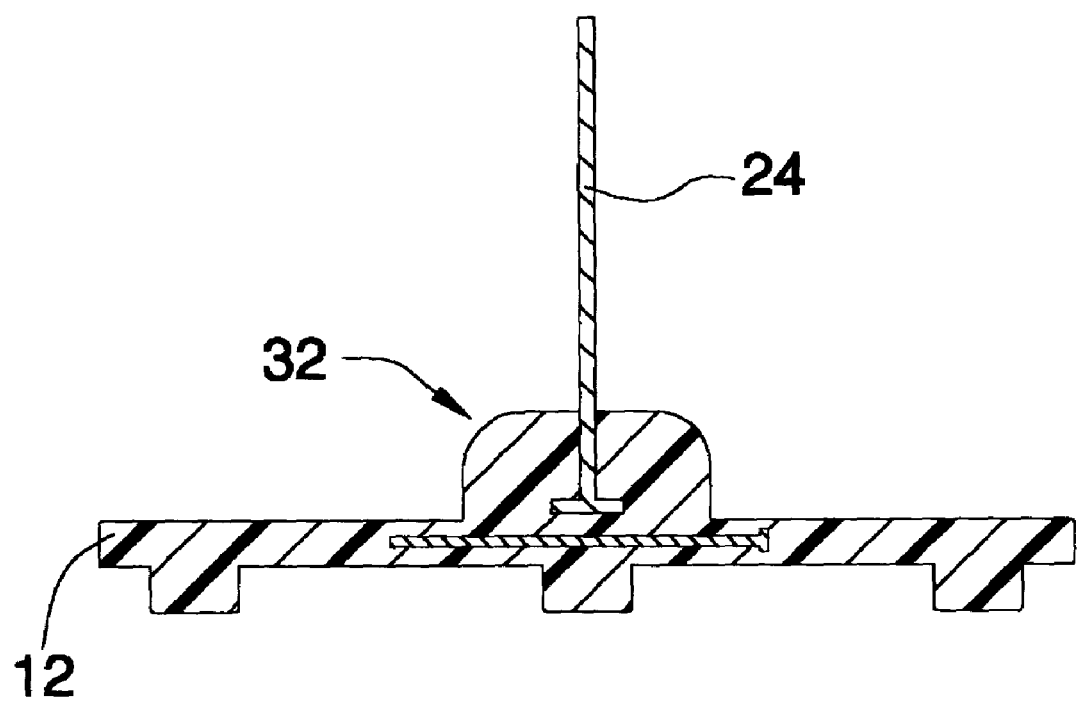
FIG. 5 is a schematic cross-sectional view of the second embodiment of the present invention.

In a second embodiment shown in FIGS. 4 and 5, the tool 10 preferably includes a cracking member 22 storage well 46 that extends into one of the end edges 18. The well 46 has a size and shape for selectively receiving the cracking member 22 in a stored position. When not in use, the cracking member 22 is positioned within the well 46 to prevent injury and to provide easy storage of the tool.

In use, the cracking member 22 is mounted on the base 12. When a crab is to be cracked open, the user holds the crab by the legs so that the back is directed toward the upper edge 26 of the plate 24. The crab is then brought down in a quick motion on the upper edge 26 so that the crab is cracked open and into two pieces.

With respect to the above description then, it is to be realized that the optimum dimensional relationship for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A tool for cracking crabs, said tool comprising:
a base having a top surface, a bottom surface, a pair of end edges and a pair of side edges, said base comprising a water buoyant material;
a cracking member, said base having a cracking member storage will extending into one of said end edges for selectively receiving said cracking member, said well being positioned between said top surface and said bottom surface, said cracking member comprising a plate, said plate including an upper edge and a lower edge, wherein a crab may be cracked upon said upper; and
a coupler being attached to said top surface for selectively attaching said bottom edge of said cracking member to said base such that said cracking member extends upwardly from said base.

2. The tool of claim 1, wherein said top and bottom surface each having a generally rectangular shape, each of said end edges having a length generally between 8 inches and 12 inches, each of said side edges having a length generally between 8 inches and 12 inches.

3. The tool of claim 1, further including a flange being attached to and extending along a length of said lower edge, and flange being orientated generally perpendicular to a plane of said plate, said flange having oppositely positioned edge extending in opposite directions with respect to said plane of said plate.

4. The tool of claim 3, wherein said coupler includes a raised section generally extending between said end edges of said top surface, said raised section having a slot extending through a length thereof, said slot having a horizontal portion and a vertical portion extending away from the horizontal portion and upwardly through an upper side of said raised surface, wherein said flange may be removably extended into said horizontal portion such that said plate extends upwardly through said vertical portion.

5. The tool of claim 1, further including a plurality of feet being attached to said bottom surface.

6. The tool of claim 5, wherein each of said feet are elongated and each generally extends between said and edges of said base.

7. The tool of claim 1, wherein said water buoyant material is a wood material.

8. A tool for cracking crabs, and tool comprising:
a base having a top surface, a bottom surface, a pair of end edges and a pair of side edges, said top and bottom surfaces each having a generally rectangular shape, each of said end edges having a length generally between 8 inches and 12 inches, each of said side edges having a length generally between 8 inches and 12 inches, said base comprising a water buoyant material;
a cracking member includes a plate having an upper edge and a lower edge, a flange being attached to and extending along a length of said lower edge, said flange being oriented generally perpendicular to a plane of said plane, said flange extending in opposite directions with respect to said plane of said plate;
a coupler being attached to said top surface for selectively attaching said cracking member to said base such that said cracking member extends upwardly from said base, said coupler being generally positioned in a central area of said top surface, said coupler including a raised section generally extending between said end edges of said top surface, said raised section having a slot extending through a length thereof, said slot having a horizontal portion and a vertical portion extending away from the horizontal portion and upwardly through an upper side of said raised surface, wherein said flange may be removably extended into said horizontal portion such that said plate extends upwardly through said vertical portion;
a plurality of feet being attached to said bottom surface, each of said feet being elongated and generally extending between said end edges of said base; and
a cracking member storage well extending into one of said end edges, said well having a size and shape for selectively receiving said cracking member in a stored position.

9. A tool for cracking crabs, said tool comprising:
a base having a top surface, a bottom surface, a pair of end edges and a pair of side edges, said base comprising a water buoyant material;
a cracking member, said base having a cracking member storage well extending into one of said end edges for selectively receiving said cracking member, said well being positioned between said top surface and said bottom surface, said cracking member including a plate having an upper edge and a lower edge, a flange being attached to and extending along a length of said lower edge, and flange being oriented generally perpendicular to a plane of said plate, said flange having oppositely positioned edge extending in opposite directions with respect to said plane of said plate; and
a coupler being attached to said top surface for selectively attaching said cracking member to said base such that said cracking member extends upwardly from said base, said coupler including a raised section generally extending between said end edges of said top surface, said raised section having a slot extending through a length thereof, said slot having a horizontal portion and a vertical portion extending away from the horizontal portion and upwardly through an upper side of said raised surface, wherein said flange may be removably extended into said horizontal portion such that said plate extends upwardly through said vertical portion.

10. The tool of claim 9, further including a plurality of feet being attached to said bottom surface.

11. The tool of claim 10, wherein each of said feet are elongated and each generally extends between said end edges of said base.

* * * * *